United States Patent Office 2,883,429
Patented Apr. 21, 1959

2,883,429

1,1 DIETHOXY-3,3,3-TRIFLUOROPROPANE

Robert Neville Haszeldine, Cambridge, England

No Drawing. Application August 31, 1953
Serial No. 377,710

1 Claim. (Cl. 260—615)

This invention relates to polyfluorinated polyethers and polyfluorocarbonyl compounds.

It has been noted that a polyfluoro hydrocarbon group in an organic molecule may have a marked effect on the chemical properties of adjacent functional groups. The present invention is concerned with the reactions of unsaturated ethers which contain a polyfluorinated hydrocarbon group close to the ether group therein, and is also concerned with certain of the resulting reaction products of such unsaturated ethers, in particular a new class of resulting polyethers.

In accordance with one aspect of my invention, there is provided a new and useful class of polyfluorinated polyethers having the general formula:

$$R_F CH_2 \underset{H}{\overset{OR'}{\underset{|}{C}}} - OR$$

wherein $R_F$ is a polyfluorinated hydrocarbon group having two fluorine atoms on the carbon atom adjacent to the $CH_2$ group in the formula and having not more than about 20 carbon atoms, and R and R' are hydrocarbon or substituted hydrocarbon groups, e.g., alkyl, halogenoalkyl, alkenyl, halogenoalkenyl, aryl, halogenoaryl, cycloalkyl, halogenocycloalkyl, and the like, preferably alkyl or halogenoalkyl having not more than about 20 carbon atoms.

In preparing the above new classes of polyfluorinated polyethers, an addition reaction is effected between an alcohol and an unsaturated ether as follows:

$$R_F CH = \underset{H}{\overset{OR'}{\underset{|}{C}}} + ROH \longrightarrow R_F CH_2 \underset{H}{\overset{OR'}{\underset{|}{C}}} - OR$$

where $R_F$, R and R' have the same meaning as given above.

The above addition reaction is conveniently carried out by subjecting the reactants to somewhat elevated temperatures and pressures in the presence of a base, e.g., an alkali metal or alkaline earth metal alcoholate of the alcohol involved, and it is preferred that the two reactants should be such that the polyfluorinated polyether product be represented by the general formula given above wherein the symbols R and R' are as follows:

R and R' are alkyl, halogenoalkyl, alkenyl, halogenoalkenyl, cycloalkyl, halogenocycloalkyl, aryl or halogenoaryl groups preferably containing not more than about 20 carbon atoms, the aryl groups are preferably phenyl or halogenophenyl groups or their analogues or homologues. Alternatively R and R' may desirably be represented by the general formula $R'_F(CH_2)_n$ in which $R'_F$ is a $C_1$–$C_{20}$ perfluoroalkyl group and $n$ is an integer from 1–6. R and R' may of course be different.

In preparing the new polyfluorinated polyethers of the invention by the reaction involving the addition of an unsaturated ether or an alcohol in the presence of a base, it is of course necessary that the reactants be appropriately chosen so that any substituent group therein does not interfere with the addition as by being reactive towards the base used as catalyst. Thus, for example, where the substituents R and R' in the two reactants are halogenoalkyl (other than fluoroalkyl) or halogenoalkenyl, the halogen substituents in R and R' should be such as to be substantially non-reactive towards the base catalyst.

Examples of suitable unsaturated ether starting materials include the methoxy-, ethoxy-, phenoxy-, chloromethoxy-, -ethoxy-, and -phenoxy-, and fluoro-methoxy-, -ethoxy-, and -phenoxy-trifluoropropenes, -trifluorobutenes, and -polyfluorochlorobutenes, -pentenes, and -hexenes; examples of the alcohol starting material include lower alcohols such as methanol, ethanol, and the corresponding halogenoalkanols, and phenols, halogenophenols, their homologues and substitution products. Examples of specific new polyfluorinated polyethers provided by the invention are 3,3-dimethoxy-1,1,1-trifluoropropane, 3,3-diethoxy-1,1,1-trifluoropropane, 3-methoxy-3-ethoxy-1,1,1 - trifluoropropane, 3,3-diphenoxy-1,1,1-trifluoropropane, 3-phenoxy-3-ethoxy-1,1,1-trifluoropropane, 3,3-bis ($\beta,\beta,\beta$ - trifluoroethoxy)-1,1,1-trifluoropropane, 3-($\beta,\beta,\beta$-trifluoroethoxy) - 3 - phenoxy - 1,1,1-trifluoropropane, 3-$\beta$-chloroethoxy - 3 - methoxy - 1,1,1-trifluoropropane and 3-p-chlorophenoxy-3-ethoxy-1,1,1-trifluoropropane.

One important use of these new polyfluorinated polyethers, which is another aspect of my invention, involves their conversion into polyfluorocarbonyl compounds by hydrolysis. This may conveniently be done by hydrolysis reactions such as warming the polyether with sulfuric acid or other acid. This reaction may be illustrated by the following equation:

$$R_F CH_2 \underset{H}{\overset{OR'}{\underset{|}{C}}} - OR + H_2 O \longrightarrow R_F CH_2 \underset{H}{\overset{O}{\underset{\|}{C}}} + ROH + R'OH$$

in which the symbols used have the same meaning as noted above.

The following example is illustrative of the various aspects of my invention. All parts are by weight.

EXAMPLE

*Addition of ethanol to 1-ethoxy-3,3,3-trifluoropropene and hydrolysis of the resulting 1,1-diethoxy-3,3,3-trifluoropropane to trifluoropropionaldehyde*

To pure 1-ethoxy-3,3,3-trifluoropropene (1.70 parts) was added ethanol (20 parts) containing sodium ethoxide (4 parts), and the closed reaction vessel was then heated at 80° C. for 1.5 hr. No volatile products were obtained. The contents of the vessel were poured into water to dissolve the precipitated sodium fluoride, neutralized with sulfuric acid, and the lower layer removed. Distillation in vacuo gave a trace of unchanged 1-ethoxy-3,3,3-trifluoropropene and a residual liquid of higher boiling point. Sulfuric acid was added to the latter material and the mixture was heated to 40° C. at atmospheric pressure. The evolved gas was passed into 2,4-dinitrophenylhydrazine solution, and after 1 hour the temperature of the still was slowly raised to 120° C. After sweeping out the flask with nitrogen, the precipitated 2,4-dinitrophenylhydrazone of the trifluoropropionaldehyde was recrystallized from ethanol to give M.P. 150–151° C. (which is in agreement with the literature for this hydrazone). The yield of 3,3,3-trifluoropropionaldehyde was 28%.

In addition to their use as chemical intermediates, certain of the novel compounds of the invention are useful as surface active agents.

Also, it should be noted that the expression polyfluorohydrocarbon group used herein does not exclude hydrocarbon groups in which halogen substituents other than fluorine are present.

It will be obvious to those skilled in the art that many modifications may be made within the scope of the present invention without departing from the spirit thereof, and the invention includes all such modifications.

I claim:

1,1-diethoxy-3,3,3-trifluoropropane.

References Cited in the file of this patent

UNITED STATES PATENTS

| | | |
|---|---|---|
| 2,350,147 | Borglin | May 30, 1944 |
| 2,358,314 | Bruson | Sept. 19, 1944 |
| 2,393,510 | Bailey et al. | Jan. 22, 1946 |
| 2,399,976 | Ballard | May 7, 1946 |
| 2,522,566 | Chaney | Sept. 19, 1950 |
| 2,681,370 | Husted et al. | June 15, 1954 |
| 2,732,370 | Codding | Jan. 24, 1956 |

FOREIGN PATENTS

| | | |
|---|---|---|
| 352,474 | Great Britain | July 6, 1931 |

OTHER REFERENCES

Cromeans, Abstract of application Ser. No. 43,202, published November 20, 1951, 652 O.G. 891.